(12) United States Patent
Chin-Cheng et al.

(10) Patent No.: US 6,731,087 B1
(45) Date of Patent: May 4, 2004

(54) FAN MOTOR

(76) Inventors: Huang Chin-Cheng, P.O. Box 2-10, Tainan City (TW); Huang Chuan Pan, P.O. Box 2-10, Tainan City (TW)

( * ) Notice: Subject to any disclaimer, the term of this patent is extended or adjusted under 35 U.S.C. 154(b) by 0 days.

(21) Appl. No.: 10/225,726

(22) Filed: Aug. 19, 2002

(51) Int. Cl.$^7$ .......................... H02K 47/20; H01F 38/18
(52) U.S. Cl. ...................... 318/459; 318/500; 318/530; 318/140
(58) Field of Search .................. 318/140, 148, 318/459, 494, 500, 502, 530, 531, 818; 336/170, 173, 180, 192, 225

(56) References Cited

U.S. PATENT DOCUMENTS

| | | | | |
|---|---|---|---|---|
| 3,633,082 A | * | 1/1972 | Hasegawa et al. | 318/762 |
| 3,891,905 A | * | 6/1975 | Muller | 318/254 |
| 3,902,103 A | * | 8/1975 | Gross | 318/806 |
| 4,176,307 A | * | 11/1979 | Parker | 318/798 |
| 4,300,089 A | * | 11/1981 | Kawabe et al. | 322/8 |
| 4,388,579 A | * | 6/1983 | Ellis | 318/732 |
| 6,392,370 B1 | * | 5/2002 | Bedini | 318/140 |

* cited by examiner

Primary Examiner—Bentsu Ro

(57) ABSTRACT

A fan motor includes a rotor coil and a stator coil. The stator coil has its starting coil or rotating coil provided with an auto-coupling tapped coil or a third coil to make up a secondary coil of the starting coil or the rotating coil. The tapped coil or the secondary coil is coupled to produce a voltage value to be supplies as power for a DC motor for the swinging head of an electric fan, or power for a stabilized and rectified circuit, able to economize producing cost and supply the fan motor with a large current.

2 Claims, 4 Drawing Sheets

FAN MOTOR

BACKGROUND OF THE INVENTION

This invention relates to a fan motor, particularly to one simple in structure, and able to supply a stable and large current for a power system and lower producing cost.

Conventionally, the power circuit of a control circuit system of an electric fan is classified into three kinds. The first one, as shown in FIG. 1, is a resistance drop device, in which a plurality of resistances R1–R4 are connected with each other in parallel at the input of a system power (AC input) to lower the input voltage of the control circuit system. Then, this input voltage is converted into a direct current power (VCC) through a rectified circuit to supply a control circuit for an entire electric fan (inclusive of its swinging head) with power.

The second one, as shown in FIG. 2, is a capacitance drop device, in which a capacitor (C3) is provided at the input of the alternating current (AC input) to lower the voltage of the input, which is then converted into direct current power (VCC) through the rectified circuit to supply sequently a control circuit with power.

The third one, as shown in FIG. 3, is to provide a transformer T at the input of the alternating current (AC input). The transformer T is able to directly and stably lower the voltage of the AC input power, and then this lowered voltage is converted into direct current power (VCC) through the rectified circuit to supply sequently a control circuit with power.

However, the first and the second conventional fan motor respectively having a resistance and a capacitance drop device are comparatively applicable to a control circuit system of small current (around 15 m amperes), able to reduce producing cost, but possible to limit practicability due to its supplying only a small current.

The third conventional fan motor provided with a transformer is able to supply a stable and large current for a power, but its producing cost may increase one fifth to one third, not conforming to economic gain.

SUMMARY OF THE INVENTION

The objective of the invention is to offer a fan motor simple in structure, and able to supply a stable and large current for a power system and lower producing cost.

The feature of the invention is that the stator coil of a single-phase motor has its starting coil or rotating coil provided with an auto-coupling tapped coil or a third coil to form a secondary coil to supply a voltage value for the power of a control circuit, having function of supplying a stable and large current for a power system and applicable to electric fans or other appliances.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
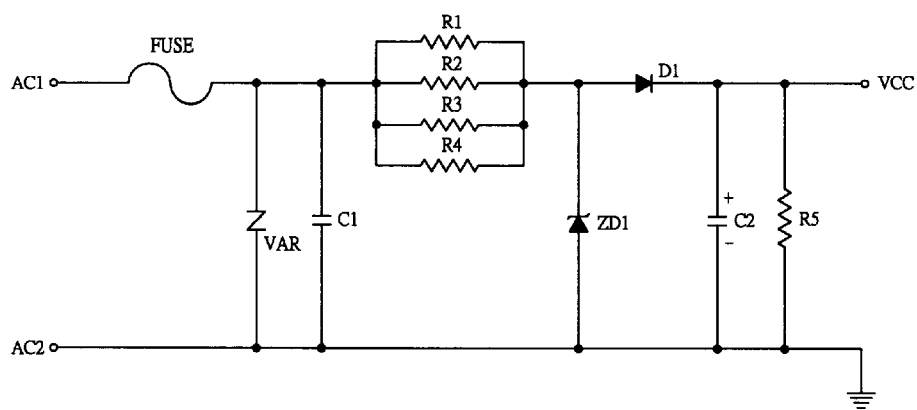
FIG. 1 is a diagram of a first kind of a conventional power circuit of a fan motor.
Figure 2:
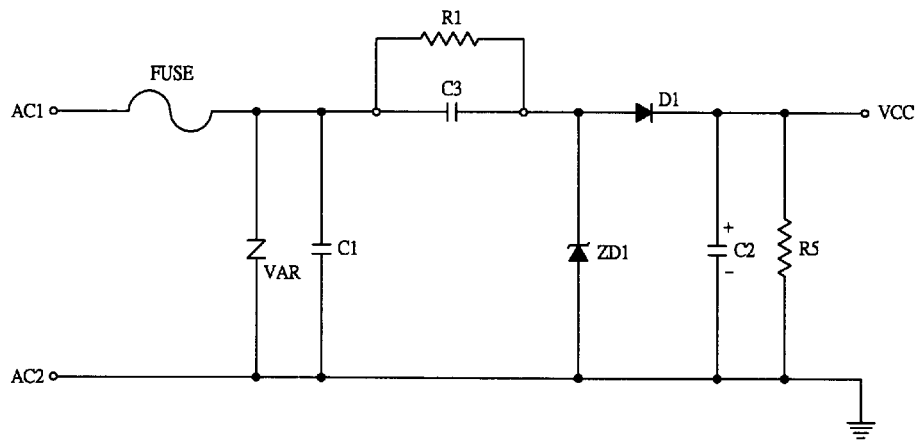
FIG. 2 is a diagram of a second kind of a conventional power circuit of a fan motor.
Figure 3:
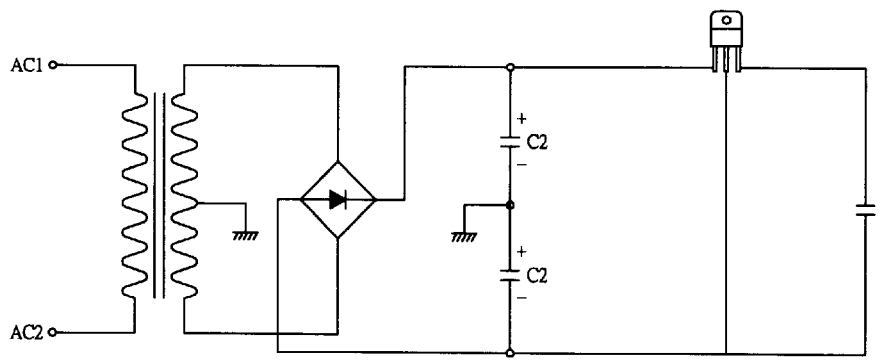
FIG. 3 is a diagram of a third kind of a conventional power circuit of a fan motor.
Figure 4:
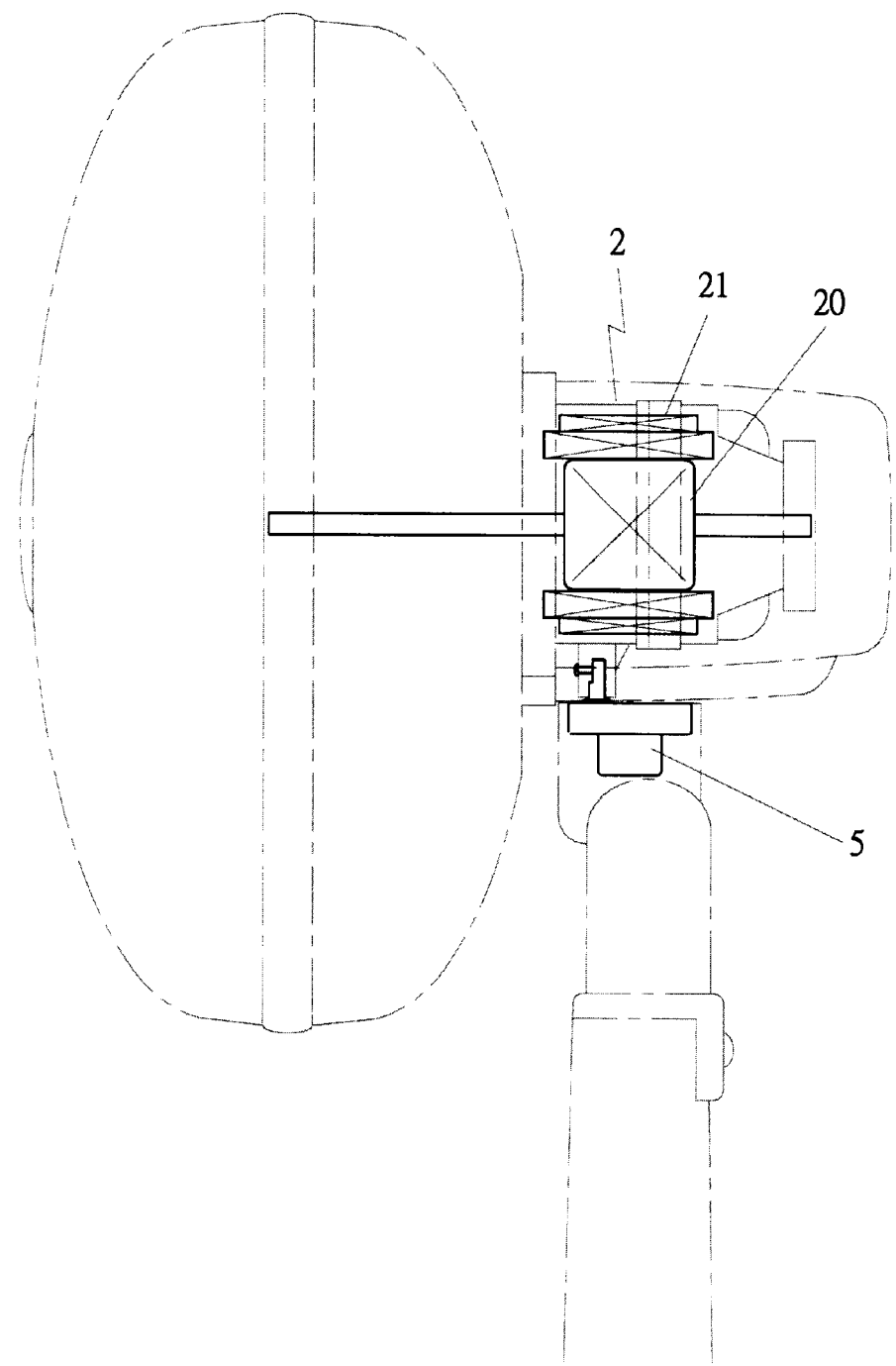
FIG. 4 is a side cross-sectional view of a motor applied to an electric fan in the present invention.
Figure 5:
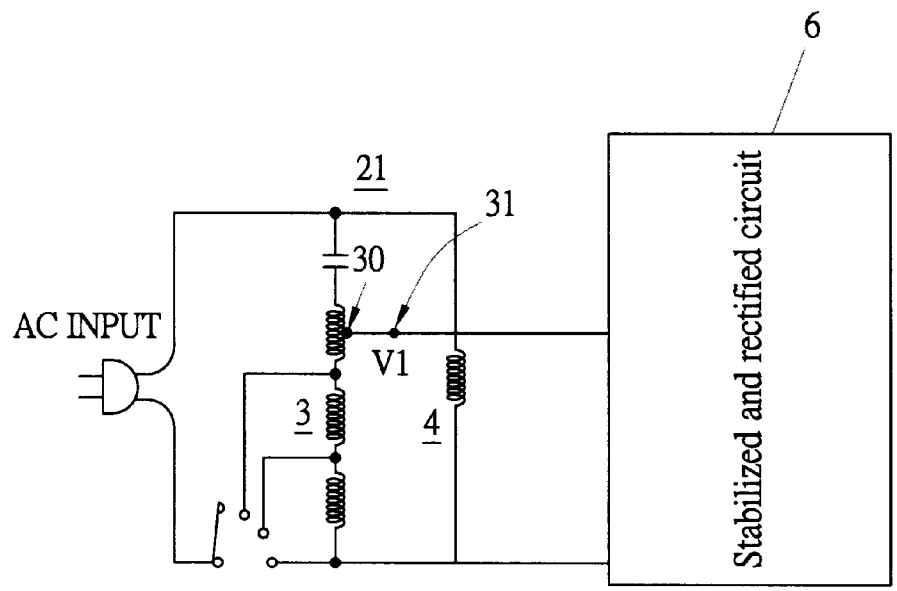
FIG. 5 is a diagram of a first embodiment of a fan motor in the present invention.

A first preferred embodiment of a fan motor in the present invention, as shown in FIG. 5, includes a single-phase motor having a rotor coil 20 and a stator coil 21. The stator coil 21 is provided with a starting coil 3 and a rotating coil 4, and the starting coil 3 is provided with an auto-coupling tapped coil 30, which is able to produce a coupled magnetic field functioning as a transformer, therefore the voltage value (V1) produced at the output terminal 31 of the tapped coil 30 is able to supply sequently the stabilized and rectified circuit 6 or a DC motor 5 for the swinging head of an electric fan with power.

Figure 6:
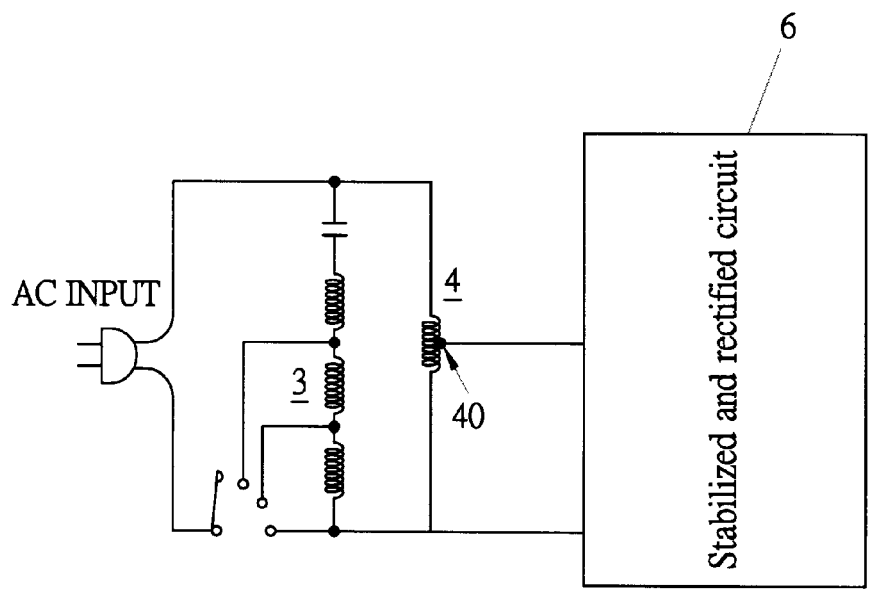
FIG. 6 is a diagram of a second embodiment of a fan motor in the present invention.

A second preferred embodiment of a fan motor in the present invention, as shown in FIG. 6, is to have the rotating coil 4 provided with an auto-coupling tapped coil 40 to produce a coupled magnetic field functioning as a transformer, therefore the voltage value (V1) produced at the output terminal 41 of the tapped coil 40 is able to supply sequently the stabilized and rectified circuit 6 or the DC motor 5 for the swinging head of an electric fan with power.

Figure 7:
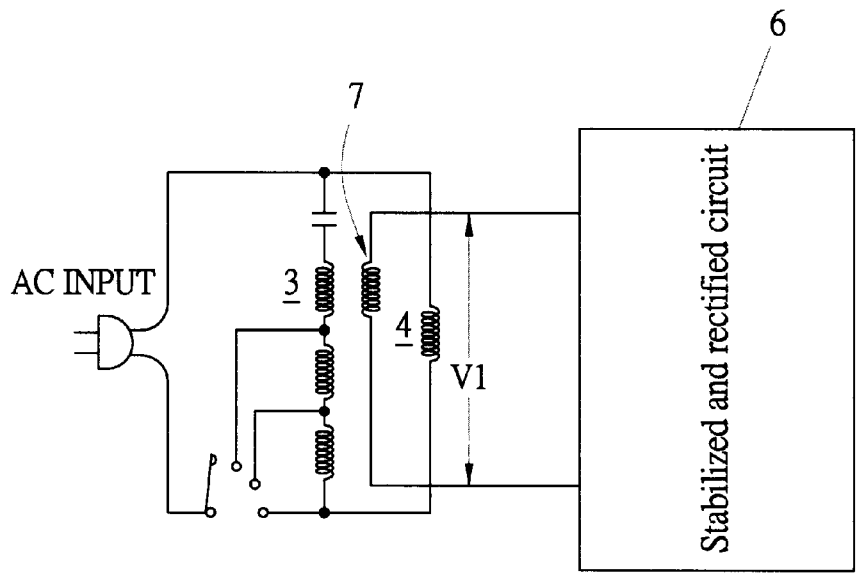
FIG. 7 is a diagram of a third embodiment of a fan motor in the present invention.
Figure 8:
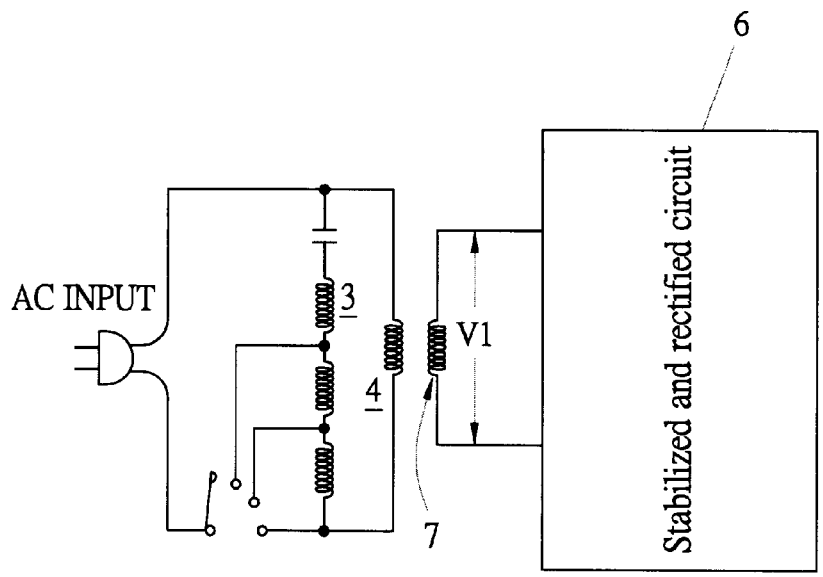
FIG. 8 is a diagram of a fourth embodiment of a fan motor in the present invention.

A third and a fourth preferred embodiments of a fan motor in the present invention, as shown in FIGS. 7 and 8, are respectively provided with a third coil 7 at the outer side of the starting coil 3 or the rotating coil 4, and this third coil 7 functions as a transformer so the voltage value (V1) provided at the output terminal 71 of the third coil 7 is able to supply sequently the stabilized and rectified circuit 6 or the DC motor 5 for an electric fan with power.

While the preferred embodiments of the invention have been described above, it will be recognized and understood that various modifications may be made therein and the appended claims are intended to cover all such modifications that may fall within the spirit and scope of the invention.

What is claimed is:

1. A fan motor being a single-phase motor, said single-phase motor comprising a rotor coil and a stator coil, said stator coil provided with a starting coil and a rotating coil, said starting coil or said rotating coil provided with an auto-coupling tapped coil, said auto-coupling tapped coil able to produce a coupled magnetic field, said auto-coupling tapped coil functioning as a transformer, a voltage value V1 produced at the output terminal of said auto-coupling tapped coil, said voltage value able to supply sequently a stabilized and rectified circuit or a DC motor for the swinging head of an electric fan with power.

2. The fan motor being a single-phase motor, said single-phase motor comprising a rotor coil and a stator coil, said stator coil provided with a starting coil and a rotating coil, said starting coil or a rotating coil provided with a third coil at one side, said third coil functioning as a transformer, a voltage value V1 produced at the output terminal of said third coil, said voltage value able to supply sequently a stabilized and rectified circuit or a DC motor for an electric fan with power.

* * * * *